(12) United States Patent
Shi et al.

(10) Patent No.: US 12,079,560 B1
(45) Date of Patent: Sep. 3, 2024

(54) METHOD OF PCB SECTIONAL PRESHRINKING, DEVICE, EQUIPMENT AND COMPUTER-READABLE STORAGE MEDIUM

(71) Applicant: HKC CORPORATION LIMITED, Shenzhen (CN)

(72) Inventors: Jun Shi, Shenzhen (CN); Hongcai Deng, Shenzhen (CN); Chunyan Li, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/493,005

(22) Filed: Oct. 24, 2023

(30) Foreign Application Priority Data

Mar. 3, 2023 (CN) .......................... 202310195850.0

(51) Int. Cl.
G06F 30/392 (2020.01)
G06F 115/12 (2020.01)

(52) U.S. Cl.
CPC ........ *G06F 30/392* (2020.01); *G06F 2115/12* (2020.01)

(58) Field of Classification Search
USPC ........................................................ 716/137
See application file for complete search history.

(56) References Cited

U.S. PATENT DOCUMENTS

| | | | | |
|---|---|---|---|---|
| 6,658,375 | B1 * | 12/2003 | McQuarrie | H05K 3/0005 |
| | | | | 703/2 |
| 7,590,968 | B1 * | 9/2009 | Becker | G06F 30/392 |
| | | | | 716/54 |
| 8,667,443 | B2 * | 3/2014 | Smayling | G06F 30/394 |
| | | | | 716/122 |

(Continued)

FOREIGN PATENT DOCUMENTS

| | | |
|---|---|---|
| CN | 103747617 A | 4/2014 |
| CN | 104812178 A | 7/2015 |

(Continued)

OTHER PUBLICATIONS

First Office Action issued in counterpart Chinese Patent Application No. 202310195850.0, dated Apr. 4, 2023.

(Continued)

*Primary Examiner* — Mohammed Alam
(74) *Attorney, Agent, or Firm* — Westbridge IP LLC (57) ABSTRACT

Disclosed are a method of PCB sectional preshrinking, a device, an equipment and a computer-readable storage medium. The method includes: obtaining a PCB raw data and a preset accuracy requirement; determining a preshrinking compensation value according to the PCB raw data and the preset accuracy requirement; determining a first sectional length according to the PCB raw data and the preshrinking compensation value; determining a preshrinking compensation ratio according to the preshrinking compensation value and the first sectional length; determining a second sectional length according to the PCB raw data, the (Continued)

first sectional length and the preshrinking compensation ratio; and determining an optimization preshrinking design length according to the first sectional length and the second sectional length.

8 Claims, 5 Drawing Sheets

(56) References Cited

U.S. PATENT DOCUMENTS

| | | | | |
|---|---|---|---|---|
| 11,320,588 B1* | 5/2022 | Mazed | ............... | G16H 10/40 |
| 2005/0127527 A1* | 6/2005 | Haimerl | ............... | H01L 24/10 |
| | | | | 257/784 |

FOREIGN PATENT DOCUMENTS

| | | |
|---|---|---|
| CN | 106659001 A | 5/2017 |
| CN | 111031685 A | 4/2020 |
| CN | 111539180 A | 8/2020 |
| CN | 114417774 A | 4/2022 |
| CN | 115204092 A | 10/2022 |
| WO | 2015096665 A1 | 7/2015 |

OTHER PUBLICATIONS

Grant Notification issued in counterpart Chinese Patent Application No. 202310195850.0, dated Apr. 28, 2023.

* cited by examiner

METHOD OF PCB SECTIONAL PRESHRINKING, DEVICE, EQUIPMENT AND COMPUTER-READABLE STORAGE MEDIUM

CROSS-REFERENCE TO RELATED APPLICATIONS

The present application claims priority to Chinese Patent Application No. 202310195850.0, filed on Mar. 3, 2023, the entire contents of which are incorporated herein by reference.

TECHNICAL FIELD

The present application relates to the technical field of printed circuits, and in particular to a method of printed circuit board (PCB) sectional preshrinking, a device, an equipment and a computer-readable storage medium.

BACKGROUND

As the liquid crystal display (LCD) becomes more mature and popular, it is more and more common for various liquid crystal display products to use a long PCB. Since the bonding will expand when heated, so a certain preshrinking value will be considered when designing the PCB. In related art, the longer the length of the PCB, the greater the corresponding preshrinking value, which leads to the fact that the PCB is too long during bonding, so that the position closer to the edge of the PCB cannot be expanded, resulting in abnormal bonding and a decrease in the production yield.

SUMMARY

The main objective of the present application is to provide a method of PCB sectional preshrinking, a device, an equipment and a computer-readable storage medium, aiming at optimizing the raw preshrinking design length of PCB, and realizing precise control of PCB Bonding accuracy and improving the production yield.

In order to achieve the above objective, the present application provides a method of PCB sectional preshrinking, including:

obtaining a PCB raw data and a preset accuracy requirement;

determining a preshrinking compensation value according to the PCB raw data and the preset accuracy requirement;

determining a first sectional length according to the PCB raw data and the preshrinking compensation value;

determining a preshrinking compensation ratio according to the preshrinking compensation value and the first sectional length;

determining a second sectional length according to the PCB raw data, the first sectional length and the preshrinking compensation ratio; and determining an optimization preshrinking design length according to the first sectional length and the second sectional length.

In an embodiment, the PCB raw data includes an actual expansion length and a theoretical expansion length.

In an embodiment, the determining the preshrinking compensation value according to the PCB raw data and the preset accuracy requirement includes:

determining a preshrinking error value according to the actual expansion length and the theoretical expansion length;

determining a maximum effective gap according to the preset accuracy requirement; and determining the preshrinking compensation value according to the preshrinking error value and the maximum effective gap.

In an embodiment, the determining the preshrinking compensation value according to the preshrinking error value and the maximum effective gap includes:

in response to the preshrinking error value being greater than the maximum effective gap, determining the preshrinking compensation value according to the preshrinking error value and the maximum effective gap.

In an embodiment, before the determining the preshrinking compensation value according to the preshrinking error value and the maximum effective gap, the method further includes:

determining whether a difference between the preshrinking error value and the maximum effective gap is within a preset threshold interval; and in response to that the difference between the preshrinking error value and the maximum effective gap is not within the preset threshold interval, performing the determining the preshrinking compensation value according to the preshrinking error value and the maximum effective gap.

In an embodiment, the PCB raw data includes a raw preshrinking design length, an actual expansion length, a quantity of gold fingers, a width of the gold fingers, and a distance between the gold fingers.

In an embodiment, the determining the first sectional length according to the PCB raw data and the preshrinking compensation value includes:

determining a PCB unit distance expansion dimension according to the raw preshrinking design length, the actual expansion length and the quantity of the gold fingers;

determining a symmetrical quantity of the gold fingers according to the PCB unit distance expansion dimension and the preshrinking compensation value; and determining the first sectional length according to the width of the gold fingers, the distance between the gold fingers, and the symmetrical quantity of the gold fingers.

In an embodiment, the determining the PCB unit distance expansion dimension according to the raw preshrinking design length, the actual expansion length and the quantity of gold fingers includes:

determining a thermal expansion strain according to the raw preshrinking design length and the actual expansion length; and determining the PCB unit distance expansion dimension according to the thermal expansion strain and the quantity of the gold fingers.

In an embodiment, the PCB raw data includes a preshrinking design value and the theoretical expansion length.

In an embodiment, the determining the second sectional length according to the PCB raw data, the first sectional length and the preshrinking compensation ratio includes:

determining a first preshrinking design ratio according to the preshrinking design value and the preshrinking compensation ratio;

determining a first section ideal expansion length according to the first sectional length and the first preshrinking design ratio;

determining a second section ideal expansion length according to the theoretical expansion length and the first ideal expansion length; and determining the second sectional length according to the preshrinking design value and the second section ideal expansion length.

In addition, in order to achieve the above objective, the present application further provides a device for PCB sectional preshrinking, including an acquisition module, and a calculation module.

In an embodiment, the acquisition module is configured to obtain a PCB raw data and a preset accuracy requirement.

In an embodiment, the calculation module is configured to determine a preshrinking compensation value according to the PCB raw data and the preset accuracy requirement.

In an embodiment, the calculation module is further configured to determine a first sectional length according to the PCB raw data and the preshrinking compensation value.

In an embodiment, the calculation module is further configured to determine a preshrinking compensation ratio according to the preshrinking compensation value and the first sectional length.

In an embodiment, the calculation module is further configured to determine a second sectional length according to the PCB raw data, the first sectional length and the preshrinking compensation ratio.

In an embodiment, the calculation module is further configured to determine an optimization preshrinking design length according to the first sectional length and the second sectional length.

In addition, in order to achieve the above objective, the present application further provides an equipment for PCB sectional preshrinking, including a PCB backplane prepared by the method of PCB sectional preshrinking as mentioned above.

In addition, in order to achieve the above objective, the present application further provides a non-transitory computer-readable storage medium storing a computer program, where the computer program, when executed by a processor, implements the method of PCB sectional preshrinking as mentioned above.

The embodiments of the present application provide the method of PCB sectional preshrinking, the device, the equipment and the computer-readable storage medium. In the method of PCB sectional preshrinking, the PCB raw data and the preset accuracy requirement are firstly obtained; then the preshrinking compensation value is determined according to the PCB raw data and the preset accuracy requirement; then the preshrinking compensation ratio is determined according to the preshrinking compensation value and the first sectional length; and the second sectional length is determined according to the PCB raw data, the first sectional length and the preshrinking compensation ratio; finally the optimization preshrinking design length is determined according to the first sectional length and the second sectional length. The embodiment of the present application optimizes the raw preshrinking design length of the PCB through data analysis of the PCB raw data and preset accuracy requirements, and obtains the optimized preshrinking design length of the PCB through a series of calculations, thereby realizing precise control of PCB Bonding accuracy and ensuring the production yield. The problem of bonding anomaly and production yield drop caused by the preshrinking design solution in the related art is overcome.

BRIEF DESCRIPTION OF THE DRAWINGS

In order to more clearly illustrate the technical solutions in the embodiments of the present application or related art, the following is a brief description of the drawings for the description of the embodiments or related art, it is obvious that the drawings in the following description are only some of the embodiments of the present application, other structures can be obtained by those skilled in the art according to structures in these drawings without creative works.

DETAILED DESCRIPTION OF THE EMBODIMENTS

The following description is provided for the purpose of illustration rather than limitation, presenting specific details such as system structures and technologies to facilitate a thorough understanding of the exemplary embodiments disclosed in the present application. However, those skilled in the art should understand that the disclosed embodiments can be implemented without these specific details. In other instances, detailed descriptions of well-known systems, devices, circuits, and methods may be omitted to avoid unnecessary complexity that could hinder the description of the disclosed embodiments.

It should be noted that although a logical sequence is depicted in the flowcharts, in some cases, the operations shown or described may be performed in a different order than that depicted in the flowcharts. The terms "first", "second", etc., used in the specification and claims, as well as the accompanying drawings, are used to distinguish similar objects and are not necessarily intended to describe a particular sequence or order.

Furthermore, it should be understood that references to "an embodiment", "some embodiments", etc., in the present application mean that specific features, structures, or characteristics described in conjunction with that embodiment may be included in one or more embodiments of the disclosed embodiments. Thus, the use of different phrases such as "in one embodiment", "in some embodiments", "in other embodiments", "in alternative embodiments", etc., throughout this specification does not necessarily refer to the same embodiment, but rather means "one or more but not all embodiments" unless otherwise specified. The terms "including", "comprising", "having", and their variations imply "including but not limited to" unless otherwise specified in a different manner.

As the LCD becomes more mature and popular, it is more and more common for various liquid crystal display products to use longer size PCB. Since the bonding will expand when heated, so a certain preshrinking value will be considered when designing the PCB. In related art, the longer the length of the PCB, the greater the corresponding preshrinking value, which leads to the fact that the PCB is too long during bonding, so that the position closer to the edge of the PCB cannot be expanded, resulting in abnormal bonding and a decrease in the production yield.

Figure 1:
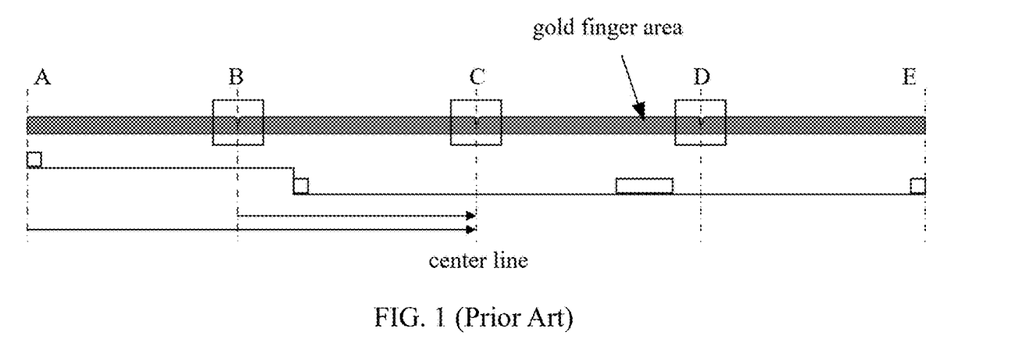
FIG. 1 is a schematic planning diagram of a technical solution for improving Bonding anomaly in related art.

At present, the technical solution for improving Bonding anomaly in related art is shown in FIG. 1. When the positions B, C, and D are not slotted, the center line of position C is regarded as the center, and the dimension of the center line is preshrunk by two sides. Assuming BC=X, AC=2X, the preshrinking rate is 0.03%(3/10000), BC' (preshrunk dimension)=0.9997X, AC' (preshrunk dimension) =0.9994X, then the preshrinking value: BC-BC'=0.0003X, AC-AC'=0.0006X. When the B, C, and D positions are slotted, it is equivalent to reducing the area of the gold finger. Dividing the gold finger into four sections for separate calculations can indeed improve the production yield of bonding, but the design method requiring special-shaped PCB is not conventional enough for cutting and affects the PCB layout routing area.

Based on this, the embodiment of the present application provides a method of PCB sectional preshrinking, device, equipment and computer-readable storage medium. The raw preshrinking design length of the PCB is optimized by performing data analysis on the PCB raw data and the preset accuracy requirements, and the optimized preshrinking design length of the PCB is obtained after a series of calculations, which not only realizes precise control of PCB Bonding accuracy, ensures the production yield, but also skips requiring special-shaped PCB and skips affecting the PCB layout routing area.

The method of PCB sectional preshrinking, device, equipment, and computer-readable storage medium provided in the embodiments of the present application are specifically described through the following embodiments. Firstly, the method of PCB sectional preshrinking in the embodiments of the present application is described.

Figure 2:
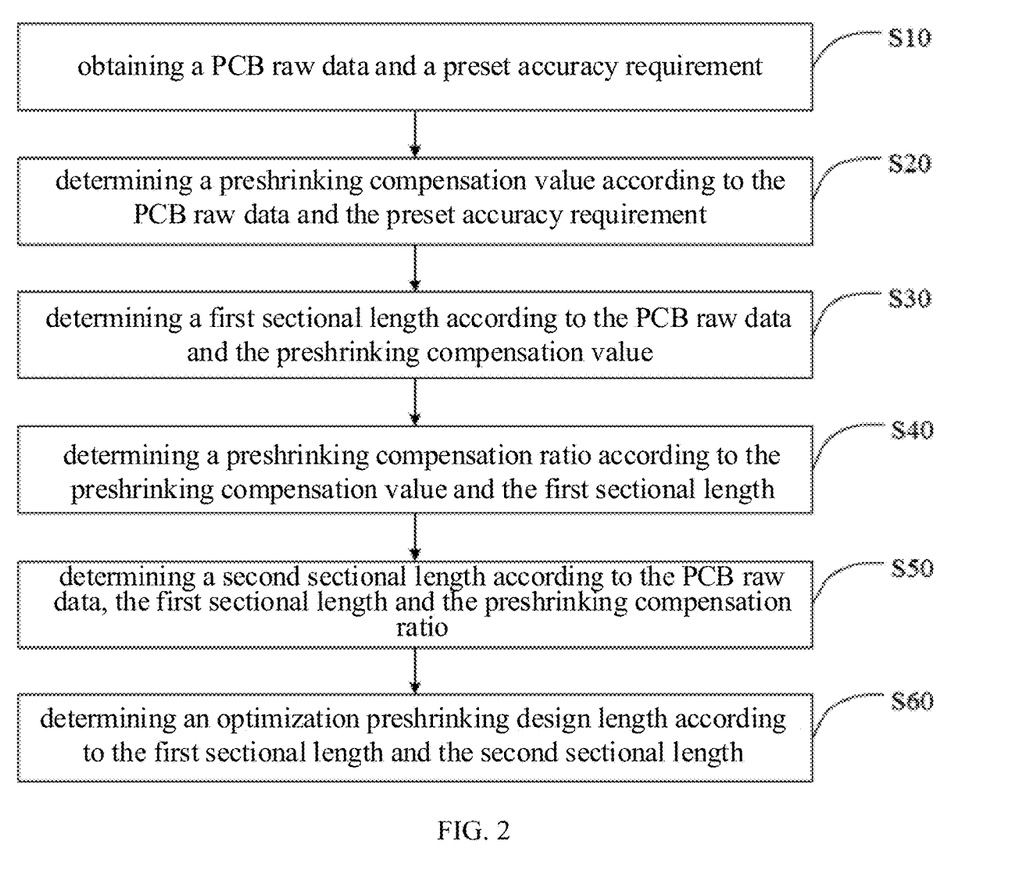
FIG. 2 is a schematic flowchart of a method of PCB sectional preshrinking according to embodiments of the present application.

An embodiment of the present application provides a method of PCB sectional preshrinking. As shown in FIG. 2, which is a schematic flowchart of a method of PCB sectional preshrinking according to embodiments of the present application. The method of PCB sectional preshrinking can be applied to the PCB sectional preshrinking equipment, as shown in FIG. 2, the method of PCB sectional preshrinking provided in this embodiment includes operations S10 to S30.

Operation S10, obtaining a PCB raw data and a preset accuracy requirement.

It should be noted that this embodiment is an improvement of the preshrinking design on a relatively long-dimension PCB in the related art. Therefore, it is first necessary to obtain the PCB raw data related to the PCB in the conventional preshrinking design solution and the Bonding accuracy requirement in the production of the current PCB (that is, the preset accuracy requirements).

Figure 3:
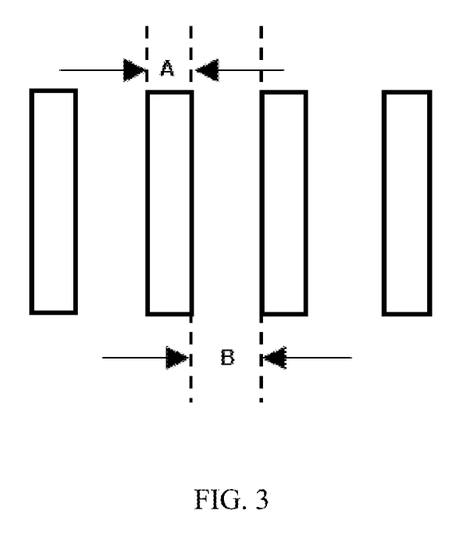
FIG. 3 is a schematic diagram of a partial PCB raw data involved in the method of PCB sectional preshrinking according to the embodiments of the present application.
Figure 4:
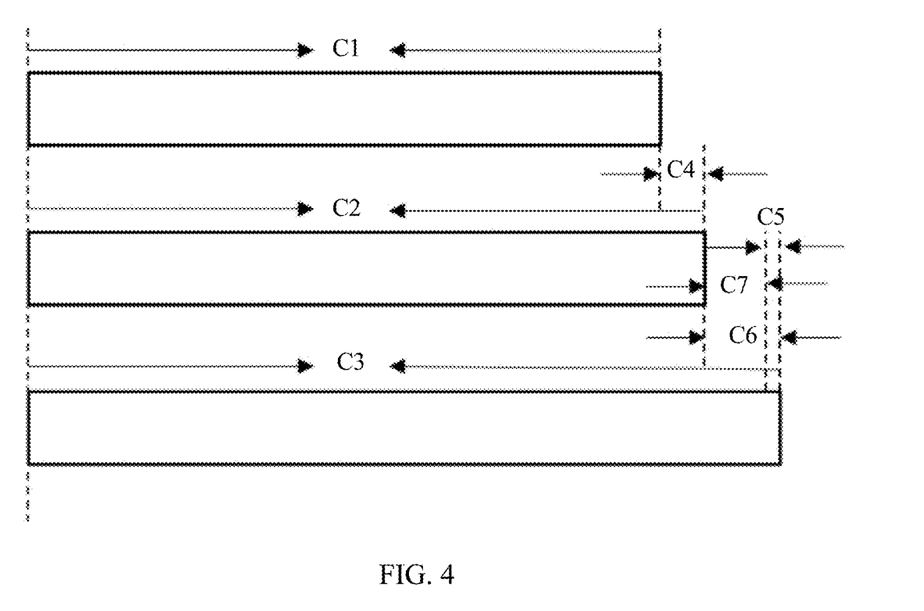
FIG. 4 is a schematic diagram of the partial PCB raw data and a calculation data involved in the method of PCB sectional preshrinking according to the embodiments of the present application.

As an example, as shown in FIG. 3 and FIG. 4, in this embodiment, the PCB raw data may include the width A of the gold finger, the distance B of the gold finger, the raw preshrinking design length C1 of the PCB, and the actual PCB thermal expansion length C2 during the Bonding process, the theoretical total length C3 after thermal expansion during the PCB preshrinking design Bonding process, etc.

As an example, in this embodiment, the preset accuracy requirement may be set to 50%, indicating that the shift amount of the FPC in contact with the PCB gold finger is required to be less than or equal to 50%.

Operation S20, determining a preshrinking compensation value according to the PCB raw data and the preset accuracy requirement.

In this embodiment, after obtaining the PCB raw data and the preset accuracy requirement, a part of the data will be selected from the PCB raw data for calculation, and then the calculation results will be compared with the preset accuracy requirements to know the preshrinking compensation value of the current PCB, that is, how much preshrinking value are needed to meet the Bonding accuracy requirements, or to achieve a higher Bonding accuracy.

In some embodiments, the above PCB raw data includes: the actual expansion length C2 and the theoretical expansion length C3; the above operation S20 includes:

determining a preshrinking error value according to the actual expansion length and the theoretical expansion length;

determining a maximum effective gap according to the preset accuracy requirement; and determining the preshrinking compensation value according to the preshrinking error value and the maximum effective gap.

It should be noted that this embodiment can be understood in conjunction with FIG. 4. The actual expansion length C2 is the actual total length of the PCB after thermal expansion during the Bonding process; the theoretical expansion length C3 is the theoretical total length after thermal expansion during the PCB preshrinking design bonding process. The preshrinking error value corresponds to C6, which is the difference between the theoretical expansion length C3 and the actual expansion length C2, that is, C6=C3−C2. The maximum effective gap is the maximum gap that is still effective for Bonding when the PCB gold finger area is after thermal expansion. For example, if the bonding accuracy is 50%, that is, $C5 \leqslant 50\%*A$ (A is the width of the gold finger), then the maximum effective gap $C5_{MAX}=50\%*A$. The preshrinking compensation value corresponds to C7, which is the difference between the preshrinking error value C6 and the maximum effective gap $C5_{MAX}$, that is, $C7=C6-C5_{MAX}$.

As an example, the above operation of determining the preshrinking compensation value according to the preshrinking error value and the maximum effective gap includes: in response to the preshrinking error value is greater than the maximum effective gap, determining the preshrinking compensation value according to the preshrinking error value and the maximum effective gap.

It is understandable that when the preshrinking error value C6 is greater than the maximum effective gap C5, it means that the PCB preshrinking design of this dimension exceeds the allowable error range and cannot meet the Bonding accuracy requirement, or it is necessary to determine the preshrinking compensation value to re-design the sectional preshrinking to the PCB of this dimension when in order to obtain a higher Bonding accuracy.

In some embodiments, before the above operation of determining the preshrinking compensation value according to the preshrinking error value and the maximum effective gap, the method of PCB sectional preshrinking further includes: determining whether a difference between the preshrinking error value and the maximum effective gap is within a preset threshold interval; if not, performing the determining the preshrinking compensation value according to the preshrinking error value and the maximum effective gap; if yes, determining the current PCB does not need sectional preshrinking design.

It should be understood that after obtaining the PCB raw data and the preset accuracy requirement, the preshrinking compensation requirements can be firstly determined, that is, to exclude the situation that the current PCB preshrinking design can meet the Bonding accuracy requirements, and avoid doing useless work. Only when the current PCB preshrinking design cannot meet the Bonding accuracy requirements, or for higher Bonding accuracy, sectional preshrinking design is required.

As an example, if the difference $C6=C3-C2$ between the total length C3 of the ideal design expansion of the PCB and the total length C2 of the actual thermal expansion strain of the PCB is less than C5, then the preshrinking design of the PCB of this dimension is within the allowable range of error and can meet the Bonding accuracy requirements, the PCB of this dimension does not need sectional preshrinking design. As shown in FIG. 4, if C6 is greater than C5, the PCB preshrinking design of this dimension exceeds the allowable range of error, and cannot meet the Bonding accuracy requirements, or for higher Bonding accuracy, it is necessary to carry out sectional preshrinking design at this time, and then execute the subsequent operation of determining the preshrinking compensation value according to the preshrinking error value and the maximum effective gap.

Operation S30, determining a first sectional length according to the PCB raw data and the preshrinking compensation value.

In this embodiment, after the preshrinking compensation value C7 is determined, the quantity of gold fingers relative to the symmetrical center of the PCB can be calculated based on some data in the PCB raw data, and then the specific length of the PCB section can be determined.

In some embodiments, the above PCB raw data includes a raw preshrinking design length C1, an actual expansion length C2, a quantity of gold finger N, a width of the gold finger A, and a distance between the gold fingers B, and the above operation S30 includes:

determining a PCB unit distance expansion dimension according to the raw preshrinking design length, the actual expansion length and the quantity of gold fingers;

determining a symmetrical quantity of the gold fingers according to the PCB unit distance expansion dimension and the preshrinking compensation value;

determining the first sectional length according to the width of the gold finger, the distance between the gold fingers, and the symmetrical quantity of the gold fingers.

In some embodiments, the above operation of determining a PCB unit distance expansion dimension according to the raw preshrinking design length, the actual expansion length and the quantity of gold fingers includes:

determining a thermal expansion strain according to the raw preshrinking design length and the actual expansion length; and determining the PCB unit distance expansion dimension according to the thermal expansion strain and the quantity of the gold fingers.

As shown in FIG. 4, in this embodiment, the actual thermal expansion strain C4 of the PCB during the Bonding process is calculated based on the raw preshrinking design length C1 and the actual expansion length C2, that is, $C4=C2-C1$ (it should be noted that the strain of the flexible printed circuit (FPC) in the bonding process with the PCB can be almost negligible relative to the thermal expansion strain of the PCB since the different constituent materials, therefore in this embodiment, it can be considered that the FPC has no strain during the Bonding process), and then based on the thermal expansion strain C4 and the quantity N of the gold finger, the average thermal expansion distance X between each gold finger is calculated (that is, the PCB unit distance expansion dimension). According to the thermal expansion distance $½*C4=N*X$ during the PCB Bonding process on one side, it can be calculated that the PCB unit distance expansion dimension $X=½*C4/N$.

After obtaining the PCB unit distance expansion dimension X, the quantity N1 of the gold finger relative distance PCB symmetry center (that is, the symmetry quantity of the gold finger, which is only used as the value for calculating the first sectional length L, and the actual number of PCB gold fingers will not be changed) can be calculated according to the corresponding relationship $½*C7=(C6-C5)/2=N1*X$ between the preset compensation value C7 and the PCB unit distance expansion dimension X.

Figure 6:
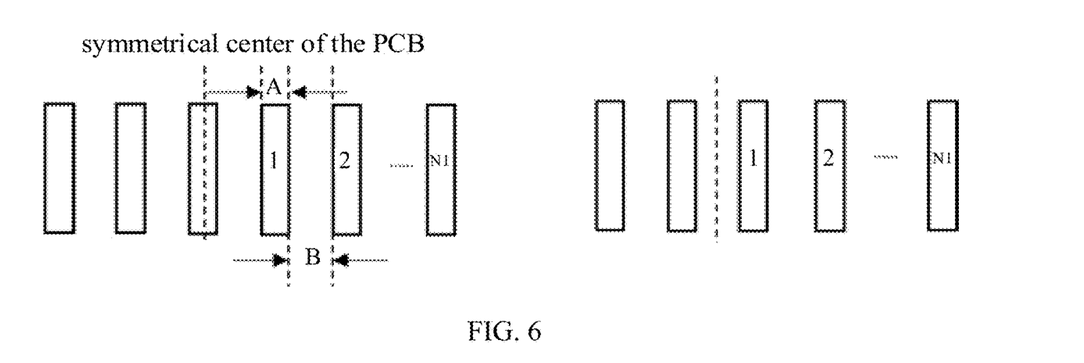
FIG. 6 is a schematic diagram of an application scenario for determining a first sectional length involved in the method of PCB sectional preshrinking according to the embodiments of the present application.

Finally, the first sectional length L can be determined by combining the width A of the gold finger, distance B of the gold finger, and the symmetry quantity N1 of the gold finger. Specifically, when the PCB symmetry center is located on a gold finger: $L=N1*B+N1*A+A/2$ (as shown in the left half part of FIG. 6), when the symmetrical center of the PCB is located between the two gold fingers: $L=N1*A+(N1-1)*B+B/2$ (as shown in the right half part of FIG. 6).

Figure 5:
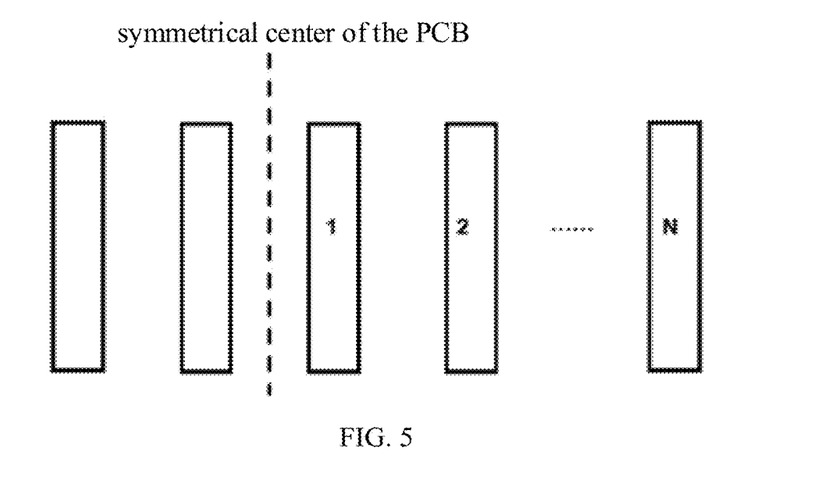
FIG. 5 is a schematic diagram of a partial PCB raw data involved in the method of PCB sectional preshrinking according to the embodiments of the present application.

As an example, as shown in FIG. 5, the quantity N of the gold fingers in this embodiment is the sum of the quantity of the gold fingers from the symmetrical center of the PCB to one side edge, rather than the total quantity of the gold fingers in the gold finger area of the PCB. It can be understood that, in the case where the symmetry center of the PCB is located between two gold fingers, the total quantity of the gold fingers is 2N, and when the symmetry center of the PCB is located on one gold finger, the total quantity of gold fingers is 2N+1.

Operation S40, determining a preshrinking compensation ratio according to the preshrinking compensation value and the first sectional length.

In this embodiment, after obtaining the preshrinking compensation value C7 and the first sectional length L, the preshrinking compensation ratio $K=C7/2/L$ can be determined.

Operation S50, determining a second sectional length according to the PCB raw data, the first sectional length and the preshrinking compensation ratio.

Figure 7:
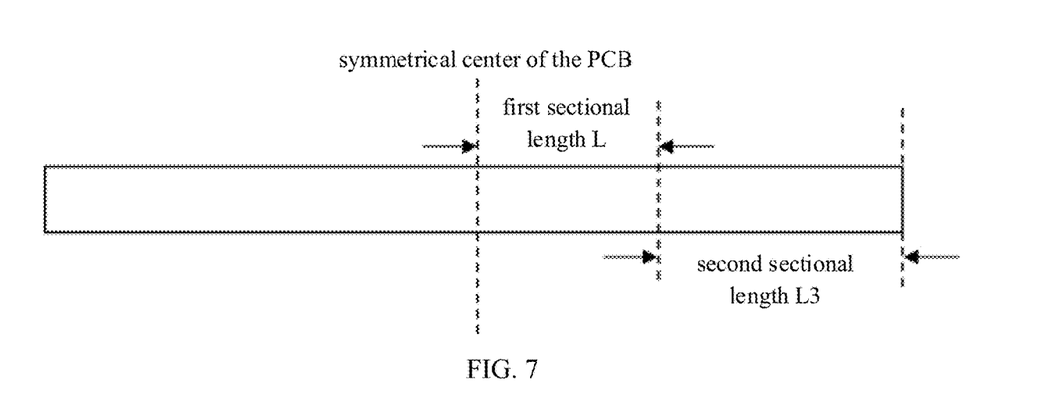
FIG. 7 is a schematic diagram of an application scenario for determining a second sectional length involved in the method of PCB sectional preshrinking according to the embodiments of the present application.

In this embodiment, when the PCB raw data is known, and the first sectional length L and the preshrinking compensation ratio K are known, as shown in FIG. 7, it can be determined that the right side of the PCB symmetry center except the first sectional length L, the remaining length of the PCB is the second sectional length. As shown in FIG. 7, the first sectional length is L, and the second sectional length is L3.

In some embodiments, the above-mentioned PCB raw data includes: preshrinking design value K0 and theoretical expansion length C3; the above-mentioned operation S50 includes:

determining a first preshrinking design ratio according to the preshrinking design value and the preshrinking compensation ratio;

determining a first section ideal expansion length according to the first sectional length and the first preshrinking design ratio;

determining a second section ideal expansion length according to the theoretical expansion length and the first ideal expansion length; and determining the second sectional length according to the preshrinking design value and the second section ideal expansion length.

Figure 8:
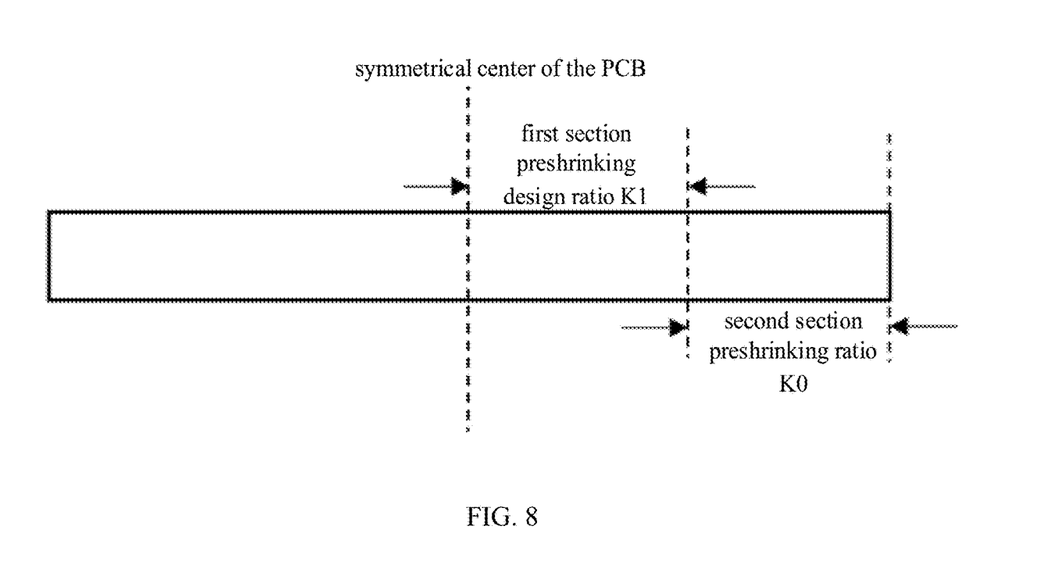
FIG. 8 is a schematic diagram of an application scenario for determining different sectional preshrinking ratios involved in the method of PCB sectional preshrinking according to the embodiments of the present application.

As an example, as shown in FIG. 7, it can be seen that in this embodiment, the symmetrical center of the PCB is used as the center line, and the right side of the PCB is first divided into the first section and the second section. The partition length of the first section is the first sectional length L, the partition length of the second section is the second sectional length L3. As shown in FIG. 8, after completing the section, the corresponding preshrinking ratio will also be provided for the two sections. In this embodiment, the first section preshrinking design ratio K1 is provided as the difference between the preshrinking design value K0 and the preshrinking compensation ratio K, that is, K1=K0−K, and the second section preshrinking ratio is provided as K0, where K0 is the original preshrinking design value in the PCB raw data.

On the basis of the above values, combined with the length L of the first section and the preshrinking design ratio K1 of the first section, the ideal expansion length L1=L*(1+K1) of the first section can be obtained; combined with the ideal expansion length of the first section L1 and the theoretical expansion length C3, the ideal expansion length L2=C3−L1 of the second section can be obtained; combined with the preshrinking design ratio K0 of the second section and the ideal expansion length L2 of the second section, and the second sectional length L3=L2*(1−K0) can be calculated.

Operation S60, determining an optimization preshrinking design length according to the first sectional length and the second sectional length.

In this embodiment, after the optimized first sectional length L and the optimized second sectional length L3 are obtained, the optimized preshrinking design length C'=2*(L+L3) of the PCB can be determined.

As an example, combined with the above-mentioned embodiments, this embodiment provides a PCB-related raw data: PCB design preshrinking ratio (that is, the preshrinking design value) K0=0.03%(3/10000), the raw preshrinking design length C1=599.82 mm, the actual expansion length C2-599.86 mm, the theoretical expansion length C3=600 mm, the width of the gold finger A=0.27 mm, the distance between the gold finger B-0.18 mm, the quantity of gold fingers N=666 (the total quantity of the gold fingers in the PCB gold finger area is 1333).

Calculated by the method of PCB sectional preshrinking provided in the above embodiment, the maximum effective gap $C5_{MAX}$=½A=0.135 mm can be obtained, since the preshrinking error value C6=C3−C2-0.14 mm is greater than $C5_{MAX}$. It can be known by determining from the method of PCB sectional preshrinking provided in the example that the PCB needs to be sectional preshrinking design, and the preshrinking compensation value C7=C6−$C5_{MAX}$=0.005 mm is calculated in turn, and the expansion dimension of the PCB unit distance X=C7/2/N=0.00003 mm, the symmetrical quantity of the gold fingers N1-C7/2/X=83, the first sectional length L=N1*(A+B)+A/2−37.485 mm, the preshrinking compensation ratio K=C7/2/L−0.00667%, the first preshrinking design ratio K1=K0−K=0.023%. On this basis, combined with the first sectional length L and the first preshrinking design ratio K1, the second ideal expansion length L1=L*(1+K1)=37.494 mm; combined with the theoretical expansion length C3 and the first ideal expansion length L1, the second ideal expansion length L2=C3/2−L1=262.506 mm. Combined the second preshrinking design ratio K0 and the second ideal expansion length L2, the second sectional length L3=L2*(1−K0)=262.427 mm can be calculated; finally, combined with the first sectional length L and the second sectional length L3 can be used to calculate the optimized preshrinking design length C1'=2*(L+L3)=599.824 mm of the PCB.

This embodiment provides a method of PCB sectional preshrinking. By analyzing the PCB raw data and the preset accuracy requirements, the raw preshrinking design length of the PCB is optimized, and the optimized preshrinking design length of the PCB is obtained through a series of calculations, not only achieves precise control of PCB Bonding accuracy and ensures the production yield, but also skips requiring special-shaped PCB, and skips affecting the PCB layout routing area.

Figure 9:
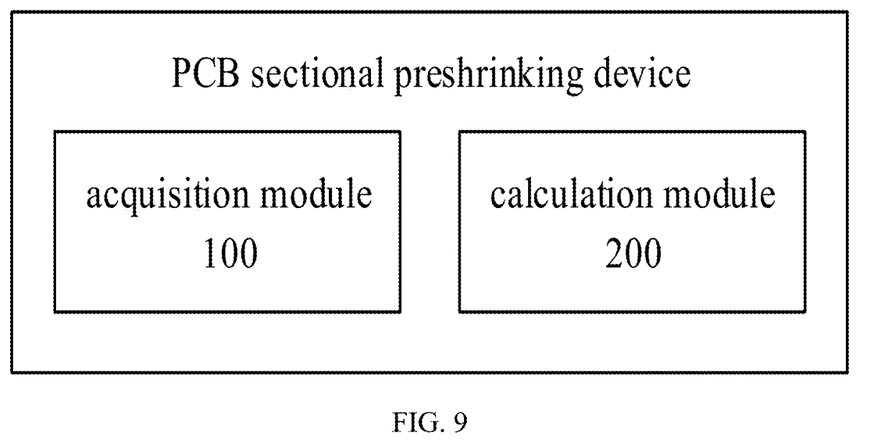
FIG. 9 is a schematic structural diagram of a PCB sectional preshrinking device according to the embodiments of the present application.

In addition, the embodiment of the present application further provides a PCB sectional preshrinking device. As shown in FIG. 9, which is a schematic structural diagram of a PCB sectional preshrinking device according to the embodiments of the present application. As shown in FIG. 9, in an embodiment, the PCB sectional preshrinking device includes: an acquisition module 100, a calculation module 200 and a processing module 300.

The acquisition module 100 is configured to obtain a PCB raw data and a preset accuracy requirement.

The calculation module 200 is configured to determine a preshrinking compensation value according to the PCB raw data and the preset accuracy requirement.

The calculation module 200 is further configured to determine a first sectional length according to the PCB raw data and the preshrinking compensation value.

The calculation module 200 is further configured to determine a preshrinking compensation ratio according to the preshrinking compensation value and the first sectional length.

The calculation module 200 is further configured to determine a second sectional length according to the PCB raw data, the first sectional length and the preshrinking compensation ratio.

The calculation module 200 is further configured to determine an optimization preshrinking design length according to the first sectional length and the second sectional length.

In some embodiments, the PCB raw data includes: the actual expansion length and theoretical expansion length; the calculation module 200 is further configured to determine the preshrinking error value according to the actual expansion length and the theoretical expansion length; determine the maximum effective gap according to the preset accuracy requirement; determine the preshrinking compensation value according to the preshrinking error value and the maximum effective gap.

In some embodiments, the calculation module 200 is further configured to determine the preshrinking compensation value according to the preshrinking error value and the maximum effective gap when the preshrinking error value is greater than the maximum effective gap.

In some embodiments, the PCB sectional preshrinking device further includes: a determining module, the determining module is configured to determine whether the difference between the preshrinking error value and the maximum effective gap is within a preset threshold range;
if not, the determining the preshrinking compensation value according to the preshrinking error value and the maximum effective gap is performed.

In some embodiments, the PCB raw data includes: the raw preshrinking design length, the actual expansion length, the quantity of gold fingers, the width of the gold fingers, and the distance between the gold fingers. The calculation module 200 is further configured to determine the PCB unit distance expansion dimension according to the raw preshrinking design length, the actual expansion length and the quantity of the gold fingers; determine the symmetrical quantity of gold fingers according to the PCB unit distance expansion dimension and the preshrinking compensation value; and determine the first sectional length according to the width of the gold finger, the gold finger spacing, and the gold finger symmetry number.

In some embodiments, the calculation module 200 is further configured to determine the thermal expansion strain according to the raw preshrinking design length and the actual expansion length; and determine the PCB unit distance expansion dimension according to the thermal expansion strain and the quality of the gold fingers.

In some embodiments, the PCB raw data includes: preshrinking design value and theoretical expansion length;
the calculation module 200 is further configured to determine the first preshrinking design ratio according to the preshrinking design value and the preshrinking compensation ratio;
determine the ideal expansion first sectional length according to the first sectional length and the first preshrinking design ratio; determine the second ideal expansion length according to the theoretical expansion length and the first ideal expansion length; and determine the second section length according to the preshrinking design value and the second section ideal expansion length.

The PCB section preshrinking device provided in this embodiment and the method of PCB sectional preshrinking provided in the above-mentioned embodiments belong to the same inventive concept, the technical details not described in detail in this embodiment can be referred to any of the above-mentioned embodiments, and this embodiment possesses the same beneficial effect as that of performing the method of PCB sectional preshrinking.

Figure 10:
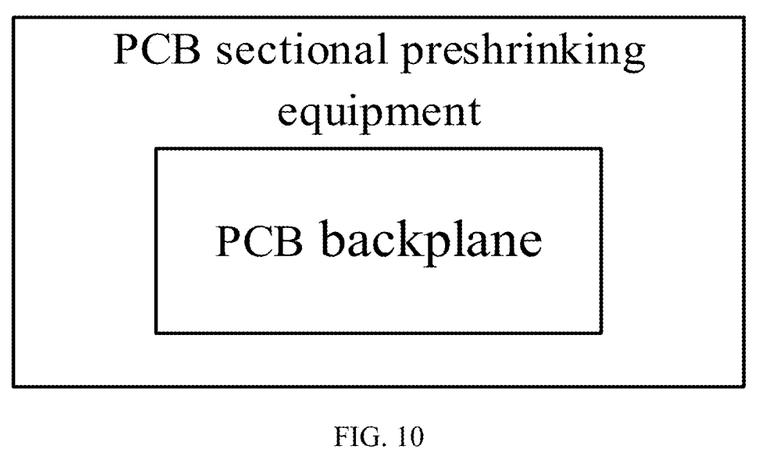
FIG. 10 is a schematic structural diagram of a PCB sectional preshrinking equipment according to the embodiments of the present application.

In addition, the embodiment of the present application further provides a PCB sectional preshrinking equipment, as shown in FIG. 10, which is a schematic structural diagram of a PCB sectional preshrinking equipment according to the embodiments of the present application. As shown in FIG. 10, the PCB sectional preshrinking equipment includes: a PCB backplane body prepared by the method of PCB sectional preshrinking provided in the above-mentioned embodiment.

Those skilled in the art can understand that the structure shown in FIG. 10 does not constitute a limitation on the PCB sectional preshrinking equipment, and may include more or less components than shown in the figure, or combine some components, or different components layout.

The PCB sectional preshrinking equipment provided in this embodiment and the method of PCB sectional preshrinking applied to the PCB sectional preshrinking equipment provided in the above-mentioned embodiments belong to the same inventive concept, the technical details not described in detail in this embodiment can be referred to any of the above-mentioned embodiments, and this embodiment possesses the same beneficial effect as that of performing the method of PCB sectional preshrinking.

In addition, the embodiment of the present application further provides a computer-readable storage medium, which is applied to a computer. The computer-readable storage medium may be a non-volatile computer-readable storage medium, and a computer program is stored on the computer-readable storage medium. When the computer program is executed by the processor, the method of PCB sectional preshrinking of any one of the above-mentioned embodiments is implemented.

Those skilled in the art can appreciate that all or some of the operations and systems disclosed in the methods disclosed above may be implemented as software, firmware, hardware, or any suitable combination thereof. Certain physical components or all physical components may be implemented as software executed by a processor, such as a central processing unit, digital signal processor, or microprocessor, or may be implemented as hardware or integrated circuits, such as application-specific integrated circuits. Such software may be distributed on computer-readable media, which may include computer storage media (or non-transitory media) and communication media (or transitory media). As known to those skilled in the art, the term "computer storage media" encompasses volatile and non-volatile, removable and non-removable media for storing information, including computer-readable instructions, data structures, program modules, or other data. Computer storage media includes, but is not limited to, RAM, ROM, EEPROM, flash memory, or other memory technologies, CD-ROM, digital versatile discs (DVDs), or other optical storage, magnetic cassettes, magnetic tapes, magnetic disk storage, or other magnetic storage devices, or any other medium that can be used to store desired information and can be accessed by a computer. Furthermore, it is understood by those skilled in the art that communication media typically includes additional data within modulated data signals, such as computer-readable instructions, data structures, program modules, or other data, and may include any information delivery media.

The above is a specific description of the implementation of the embodiment of the present application, but the embodiment of the present application is not limited to the above-mentioned implementation, and those skilled in the art can make various modifications or substitutions without violating the spirit of the embodiment of the present application. Equivalent modifications or replacements are all included within the scope defined by the claims in the embodiments of the present application.

What is claimed is:

1. A method of printed circuit board (PCB) sectional preshrinking, comprising:
obtaining a PCB raw data and a preset accuracy requirement, wherein the PCB raw data comprises an actual expansion length, a theoretical expansion length, a raw preshrinking design length, an actual expansion length, a quantity of gold fingers, a width of the gold fingers, a distance between the gold fingers, and a preshrinking design value;

determining a preshrinking compensation value according to the PCB raw data and the preset accuracy requirement;

determining a PCB unit distance expansion dimension according to the raw preshrinking design length, the actual expansion length and the quantity of the gold fingers;

determining a symmetrical quantity of the gold fingers according to the PCB unit distance expansion dimension and the preshrinking compensation value;

determining the first sectional length according to the width of the gold fingers, the distance between the gold fingers, and the symmetrical quantity of the gold fingers;

determining a preshrinking compensation ratio according to the preshrinking compensation value and the first sectional length, wherein the preshrinking compensation ratio is one-half of quotient of the preshrinking compensation value and the first sectional length;

determining a first preshrinking design ratio according to the preshrinking design value and the preshrinking compensation ratio;

determining a first section ideal expansion length according to the first sectional length and the first preshrinking design ratio;

determining a second section ideal expansion length according to the theoretical expansion length and the first ideal expansion length;

determining a second sectional length according to the preshrinking design value and the second section ideal expansion length; and determining an optimization preshrinking design length according to the first sectional length and the second sectional length.

2. The method of claim 1, wherein:

the determining the preshrinking compensation value according to the PCB raw data and the preset accuracy requirement comprises:

determining a preshrinking error value according to the actual expansion length and the theoretical expansion length;

determining a maximum effective gap according to the preset accuracy requirement; and determining the preshrinking compensation value according to the preshrinking error value and the maximum effective gap.

3. The method of claim 2, wherein the determining the preshrinking compensation value according to the preshrinking error value and the maximum effective gap comprises:

in response to the preshrinking error value being greater than the maximum effective gap, determining the preshrinking compensation value according to the preshrinking error value and the maximum effective gap.

4. The method of claim 2, wherein before the determining the preshrinking compensation value according to the preshrinking error value and the maximum effective gap, the method further comprises:

determining whether a difference between the preshrinking error value and the maximum effective gap is within a preset threshold interval; and in response to that the difference between the preshrinking error value and the maximum effective gap is not within the preset threshold interval, performing the determining the preshrinking compensation value according to the preshrinking error value and the maximum effective gap.

5. The method of claim 1, wherein:

the determining the PCB unit distance expansion dimension according to the raw preshrinking design length, the actual expansion length and the quantity of gold fingers comprises:

determining a thermal expansion strain according to the raw preshrinking design length and the actual expansion length; and determining the PCB unit distance expansion dimension according to the thermal expansion strain and the quantity of the gold fingers.

6. A printed circuit board (PCB) sectional preshrinking device, comprising:

an acquisition module configured to obtain a PCB raw data and a preset accuracy requirement, wherein the PCB raw data comprises an actual expansion length, a theoretical expansion length, a raw preshrinking design length, an actual expansion length, a quantity of gold fingers, a width of the gold fingers, a distance between the gold fingers, and a preshrinking design value; and a calculation module configured to determine a preshrinking compensation value according to the PCB raw data and the preset accuracy requirement;

wherein the calculation module is further configured to determine a PCB unit distance expansion dimension according to the raw preshrinking design length, the actual expansion length and the quantity of the gold fingers; determine a symmetrical quantity of the gold fingers according to the PCB unit distance expansion dimension and the preshrinking compensation value; and determine the first sectional length according to the width of the gold fingers, the distance between the gold fingers, and the symmetrical quantity of the gold fingers;

the calculation module is further configured to determine a preshrinking compensation ratio according to the preshrinking compensation value and the first sectional length, the preshrinking compensation ratio is one-half of quotient of the preshrinking compensation value and the first sectional length;

the calculation module is further configured to determine a first preshrinking design ratio according to the preshrinking design value and the preshrinking compensation ratio; determine a first section ideal expansion length according to the first sectional length and the first preshrinking design ratio; determine a second section ideal expansion length according to the theoretical expansion length and the first ideal expansion length; and the calculation module is further configured to determine an optimization preshrinking design length according to the first sectional length and the second sectional length.

7. A printed circuit board (PCB) sectional preshrinking equipment, comprising:

a PCB backplane prepared by the method of PCB sectional preshrinking of claim 1.

8. A non-transitory computer-readable storage medium, wherein a computer program is stored in the non-transitory computer-readable storage medium, and when the computer program is executed by a processor, the method of PCB sectional preshrinking of claim 1 is implemented.

* * * * *